(12) United States Patent
Ihs

(10) Patent No.: US 11,431,245 B2
(45) Date of Patent: Aug. 30, 2022

(54) THREE STAGE POWER DELIVERY SYSTEM

(71) Applicant: Hassan Ihs, San Diego, CA (US)

(72) Inventor: Hassan Ihs, San Diego, CA (US)

(73) Assignee: Chaoyang Semiconductor (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/161,426

(22) Filed: Jan. 28, 2021

(65) Prior Publication Data
US 2021/0234461 A1 Jul. 29, 2021

Related U.S. Application Data

(60) Provisional application No. 62/967,249, filed on Jan. 29, 2020.

(51) Int. Cl.
*G05F 1/10* (2006.01)
*G05F 3/02* (2006.01)
*H02M 3/07* (2006.01)
*H02J 7/00* (2006.01)

(52) U.S. Cl.
CPC ............. *H02M 3/07* (2013.01); *H02J 7/007* (2013.01); *H02J 7/0063* (2013.01); *H02J 2207/20* (2020.01); *H02M 3/072* (2021.05)

(58) Field of Classification Search
CPC .. H02M 3/073; H02M 3/07; H02M 2003/077; G11C 5/145; G05F 3/205
USPC .......................................................... 327/536
See application file for complete search history.

(56) References Cited

U.S. PATENT DOCUMENTS

| | | | | |
|---|---|---|---|---|
| 7,071,660 B2 * | 7/2006 | Xu | .......................... | H02M 3/156 323/266 |
| 2007/0296383 A1 * | 12/2007 | Xu | ....................... | H02M 3/1584 323/282 |
| 2009/0134861 A1 * | 5/2009 | Saeki | ..................... | H02M 3/158 323/299 |
| 2017/0084172 A1 * | 3/2017 | Rolle | ........................ | G08G 1/04 |
| 2018/0026526 A1 | 1/2018 | Ahmed et al. | | |

* cited by examiner

*Primary Examiner* — Quan Tra
(74) *Attorney, Agent, or Firm* — Klein, O'Neill & Singh, LLP

(57) ABSTRACT

A power delivery system may include a first voltage regulator configured to output an upper intermediate voltage about an expected discharge voltage plateau of a battery for use by the power delivery system, a switched capacitive charge pump configured to down convert the upper intermediate voltage of the first voltage regulator to a lower intermediate voltage, and a second voltage regulator configured to use the lower intermediate voltage to provide power to a load.

11 Claims, 12 Drawing Sheets

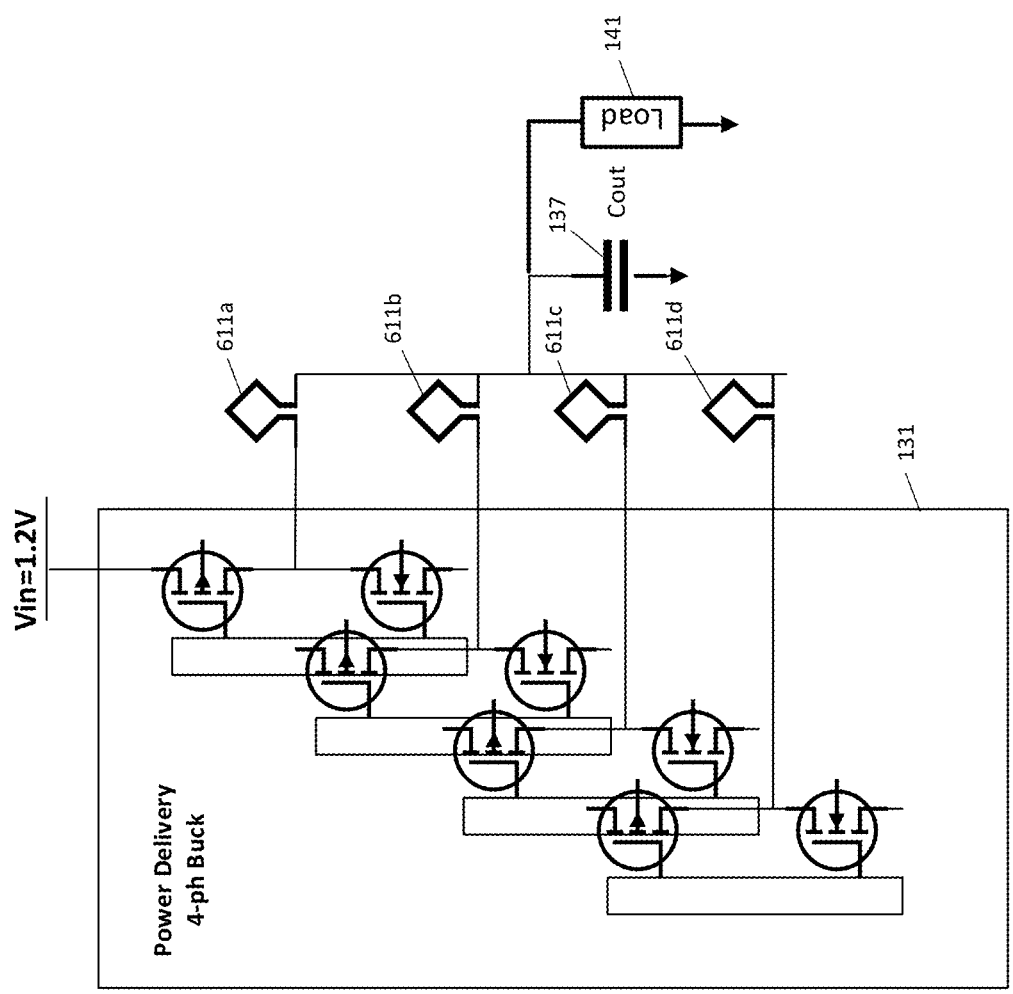

THREE STAGE POWER DELIVERY SYSTEM

CROSS REFERENCE TO RELATED APPLICATION

This application claims the benefit of the filing date of U.S. Provisional Patent Application No. 62/967,249, filed on Jan. 29, 2020, the disclosure of which is incorporated by reference herein.

BACKGROUND OF THE INVENTION

The present invention relates generally to power management for semiconductor devices, and more particularly to cascaded power management devices and their operation.

Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. This may be particularly true for those chips integrating multiple components that may be considered a system-on-chip (SOC). Complicating matters, some devices may be powered by batteries having relatively small capacities, while the devices themselves, at least at various times, may require large amounts of power.

Further complicating matters, while battery technology may remain relatively unchanged for mobile devices and the like, typically supplying voltage in the 2.8V-4.2V range for example. Voltages used in operation of the integrated circuits of SOCs, however, generally has been steadily reducing over time. Similarly, while servers and industrial applications may make use of new SOCs. Provision of power at voltage levels significantly lower than supply voltage levels may result in increased power losses as the voltage level is stepped down.

BRIEF SUMMARY OF THE INVENTION

Some embodiments provide a power delivery system, with a first voltage regulator configured to output an upper intermediate voltage about an expected discharge voltage plateau of a battery for use by the power delivery system, a switched capacitive charge pump configured to down convert the upper intermediate voltage of the first voltage regulator to a lower intermediate voltage, and a second voltage regulator configured to use the lower intermediate voltage to provide power to a load. In some embodiments the first voltage regulator is a buck voltage regulator. In some embodiments the first voltage regulator is a single phase buck voltage regulator. In some embodiments the second voltage regulator is a buck voltage regulator. In some embodiments the second voltage regulator is a multi-phase buck voltage regulator.

In some embodiments the first voltage regulator is a single phase buck voltage regulator configured to regulate output voltage of the first voltage regulator to the upper intermediate voltage when a voltage of the battery is greater than the expected discharge voltage plateau, and configured to operate as a pass device when a voltage of the battery is not greater than the expected discharge voltage plateau of the battery.

In some embodiments the expected discharge voltage plateau is 3.6 Volts. In some embodiments the switched capacitive charge pump down converts the upper intermediate voltage by a factor of 3.

In some embodiments the second voltage regulator uses discrete inductors. In some embodiments the second voltage regulator uses vias and traces of a PCB to provide inductances for the second voltage regulator.

These and other aspects of the invention are more fully comprehended upon review of this disclosure.

BRIEF DESCRIPTION OF THE FIGURES

FIG. 6A is a semi-schematic, semi-block diagram of a four-phase buck converter with PCB provided inductance, for use in a power delivery system in accordance with aspects of the invention.

DETAILED DESCRIPTION

Figure 1:
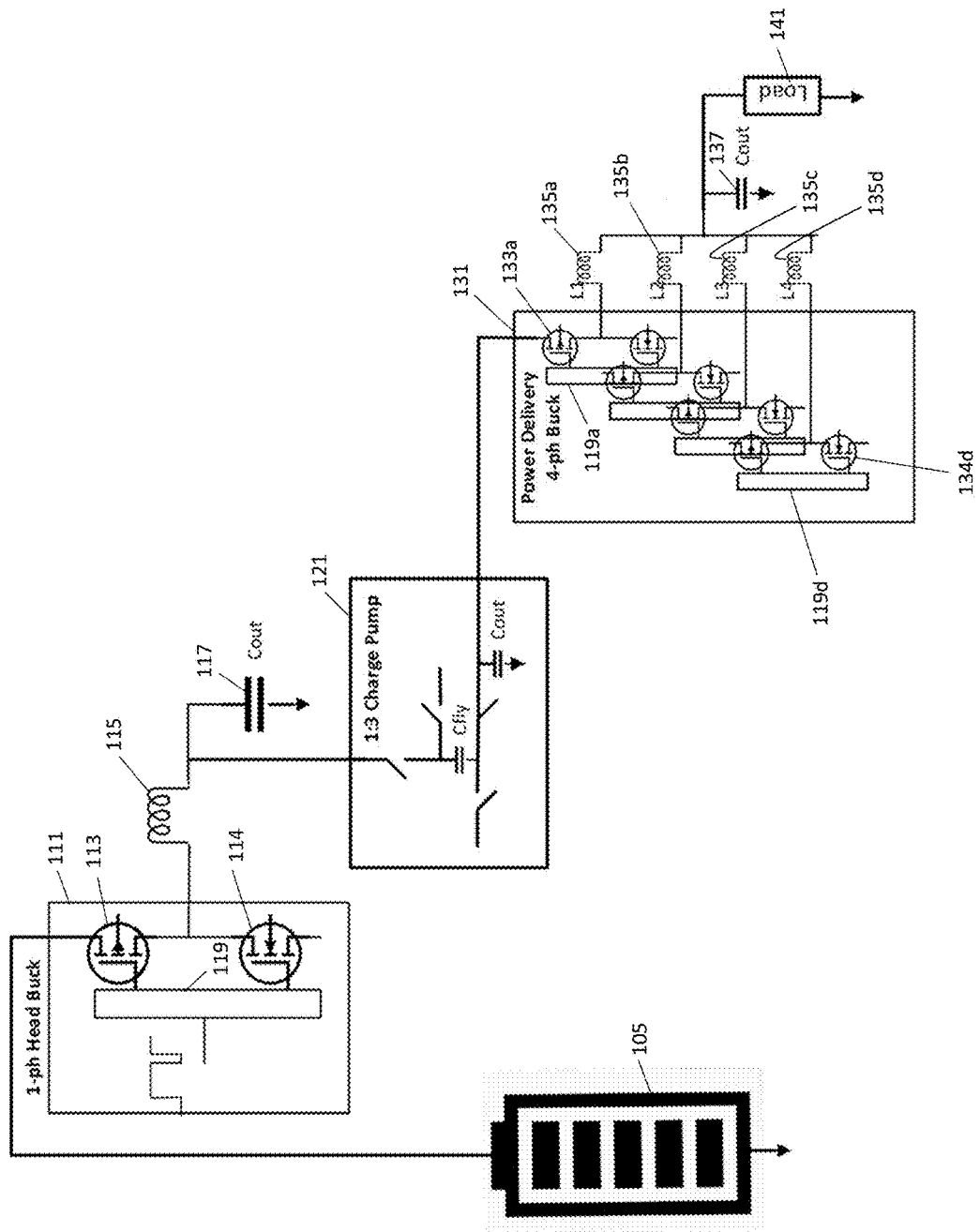
FIG. 1 is a semi-schematic, semi-block diagram including a power delivery system in accordance with aspects of the invention.

FIG. 1 is a semi-schematic, semi-block diagram including a power delivery system in accordance with aspects of the invention. A battery 105 provides power to the power delivery system. In some embodiments the battery is a lithium-ion battery. In some embodiments the battery may be rechargeable, being able to be recharged to a fully charged first voltage level, which may be about 4.2 Volts (V). During use the battery will generally discharge down to a discharge voltage plateau, which may be about 3.6 V. The battery may maintain voltage at the discharge voltage plateau for an extended period of time during operation. Afterwards the battery may relatively quickly fully discharge, down to a level of about 2.8 V in some embodiments.

The power delivery system includes a first voltage regulator 111, a switched capacitor charge pump 121, and a second voltage regulator 131, in cascade. The first voltage regulator receives power from the battery, and regulates the power from the battery to a first voltage level, generally about an expected discharge voltage plateau of the battery. The first voltage regulator is at a head of the cascade of the first voltage regulator, switched capacitor charge pump, and second voltage regulator. The first voltage regulator may therefore be considered a head voltage regulator. In most embodiments the head voltage regulator is in the configuration of a buck converter, and in many such embodiments a single phase buck converter. The first voltage regulator may therefore also be considered a head buck converter.

In the configuration of a single phase buck converter, a high side switch 113 and a low side switch 114 are coupled in series between a source of power, the battery, and ground. In operation, the high side switch may be active with the low side switch inactive, the low side switch may be active with the high side switch inactive, or both switches may be inactive. An inductor 115 has a first end coupled to a node between the high side switch and the low side switch. A second end of the inductor is coupled to ground by way of an output capacitor 117, with a node between the second end of the inductor providing an output of the single phase buck converter. In some embodiments the inductor has an inductance of 36 nH. The output of the converter may be considered an intermediate voltage, or, more particularly, an upper immediate voltage, with the switched capacitor charge pump developing a lower intermediate voltage. In some embodiments the output of the head buck converter is regulated to 3.6 V.

A controller 119 controls operation of the high side switch and the low side switch. In some embodiments the controller controls operation of the high side switch and the low side switch to regulate the output of the converter to a voltage about the expected discharge voltage plateau for the battery. In some embodiments the controller compares the voltage of the output of the converter to a reference voltage set to the voltage of the expected discharge voltage plateau of the battery in determining operation of the high side and low side switches. In some embodiments the controller is configured to keep the high side switch active and the low side switch inactive once the input voltage from the battery to the converter is equal to the expected discharge voltage plateau of the battery. In some embodiments the controller compares the input voltage from the battery with a reference voltage equal to the expected discharge voltage plateau of the battery in making the determination. In some embodiments the controller keeps the high side switch active and the low side switch inactive by setting a duty cycle of the converter to 100%.

The switched capacitor charge pump 121 down converts the output of the head voltage regulator to the lower intermediate voltage. In some embodiments the switched capacitor charge pump down converts the output of the head voltage regulator by a factor of 3. In some embodiments the output of the head voltage regulator is expected to be about 3.6 V, or 3.6 V in some embodiments, and the switched capacitor charge pump outputs about 1.2 V, or 1.2 V in some embodiments.

An output of the switched capacitor charge pump is provided to the second voltage regulator. The second voltage regulator provides regulated power to a load 141. In some embodiments the second voltage regulator may therefore be considered a power delivery regulator, as the second voltage regulator provides power to the load. In some embodiments the power to the load is regulated to between 0.2 V to 1.0 V. In some embodiments the second voltage regulator is in a configuration of a buck converter, in some embodiments in the configuration of a multi-phase buck converter, and in some embodiments in the configuration of a four-phase buck converter. The second voltage regulator may therefore also be considered a four-phase power delivery buck converter.

FIG. 1 shows the second voltage regulator as a four-phase buck converter, although in various embodiments different number of phases may be utilized. The four-phase buck converter includes four switching phases, each including its own high side switch, low side switch, and inductor path. Each switching path has a high side switch and a low side switch connected in series between an input voltage source and a lower voltage source. In FIG. 1, for example, a first phase includes a first high side switch 133a and a first low side switch coupled in series between the input voltage and the lower voltage source. Each subsequent phase similarly has a high side switch and a low side switch coupled in series between the input voltage and the lower voltage source, with a fourth phase including a fourth high side switch and a fourth low side switch 134d coupled in series between the input voltage and the lower voltage source. The input voltage source for the second voltage regulator is the output of the switched capacitance charge pump. For each switching phase, an output inductor 135a-d has a first end coupled to a node between the high side switch and the low side switch. A second end of each of the inductors is commonly coupled to an output capacitor 137, which is in parallel to a load 141. The load may be, for example, a processor core or other integrated circuitry.

The high side switches and low side switches are commanded to change states by a controller (not explicitly shown in FIG. 1.) The controller may be in the form of a processor, for example, but in many instances the controller is instead or in addition implemented using for example a custom integrated circuit (IC). In most embodiments the controller activates the switches for the different switch phases at different times. In various embodiments, for each individual phase, the controller operates the switches using pulse width modulation and/or pulse frequency modulation, with generally either only one or none of the high side and low side switches being closed at any given time. The duty cycle or pulse frequency will generally be based on a comparison of the output voltage provided to the load with a desired reference voltage. In the embodiment of FIG. 1, a period or frequency upon which operation of the switches may be based may depend on clock signals of a same frequency provided to the controller. In various embodiments, the clock signals will each be at the same frequency but phase-shifted to one another, for example by 90 degrees in the embodiment of FIG. 1, with four phases.

Figure 2:
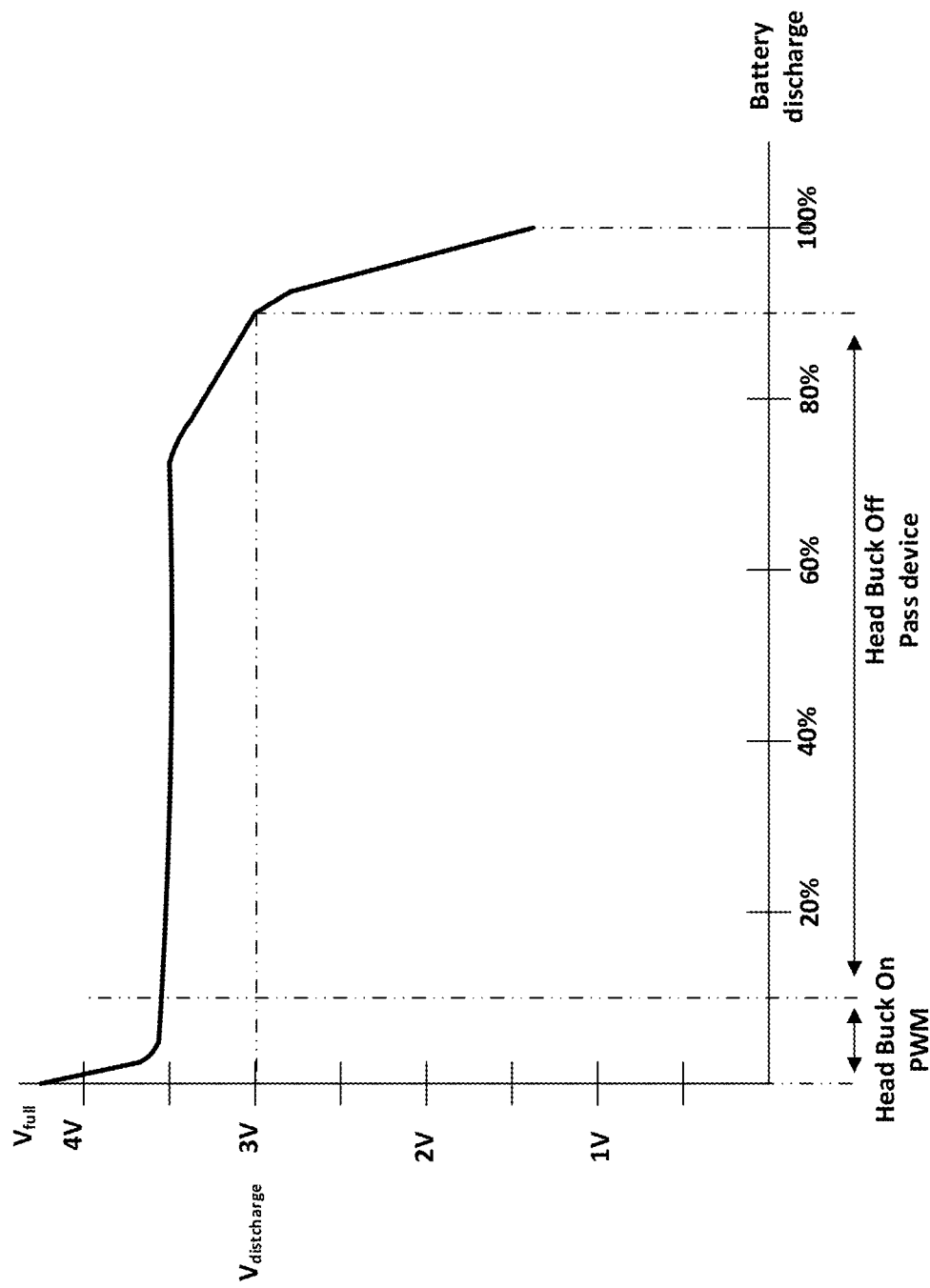
FIG. 2 is a graph showing an exemplary battery discharge profile.

FIG. 2 is a graph showing an exemplary battery discharge profile. A vertical axis of the graph shows battery voltage, and a horizontal axis of the graph shows percentage discharge of the battery. At full charge, voltage of the battery is approximately 4.2 V. At approximately 5% discharge, voltage of the battery is about 3.6 V. From approximately 5% discharge to approximately 75% discharge, voltage of the battery plateaus, staying at about 3.6 V, with perhaps a slight decrease in voltage as percentage of discharge increases. After approximately 75% discharge of the battery, voltage of the battery decreases at an increasing rate, with the battery voltage reaching about 3.0 V at approximately 90% discharge. Above approximately 90% discharge, the battery voltage drops to about below 2 V at full discharge.

FIG. 2 also provides information regarding operation of a cascaded power management delivery system, for example the system of FIG. 1. In some embodiments, and as illustrated in FIG. 2, the head buck regulator regulates the upper intermediate voltage to 3.6 V when the battery voltage is above 3.6 V. Once the battery voltage drops to 3.6 V, illustrated at approximately 10% discharge of the battery in FIG. 2, the head buck regulator keeps its high side switch on, and turns off other functions. In such a state, the head buck regulator may be considered a low ohmic pass device. The power management delivery system continues in this state until battery voltage drops to 3.0 V, at approximately 90% discharge. With battery voltage at 3.0 V or below, the power management system may cease providing power to the load.

Figure 3A:
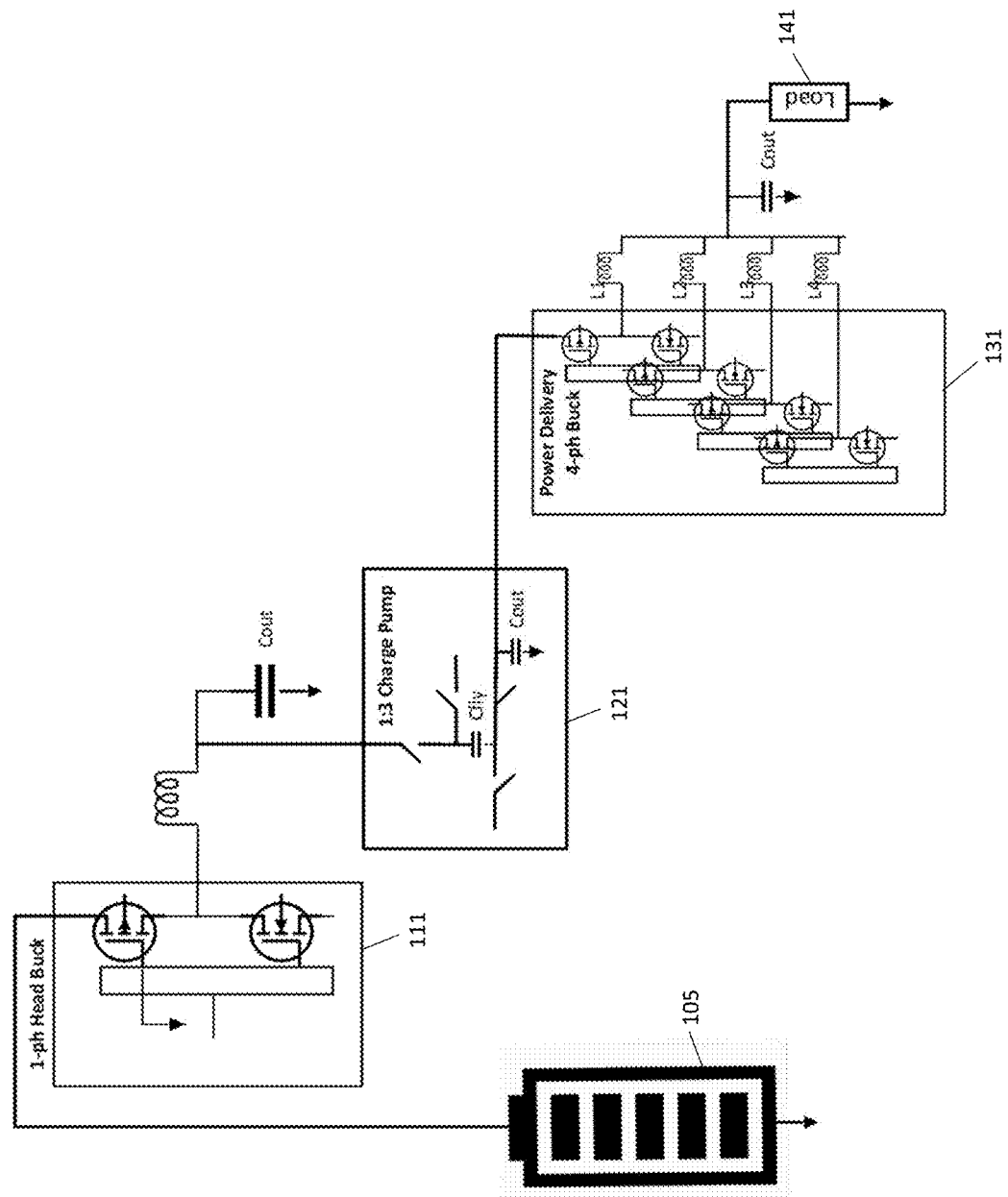
FIG. 3A is a semi-schematic, semi-block diagram illustrating operation of a power delivery system in accordance with aspects of the invention with a voltage supplied by a battery greater than a discharge voltage plateau for the battery.

FIG. 3A is a semi-schematic, semi-block diagram illustrating operation of a power delivery system in accordance with aspects of the invention with a voltage supplied by a battery greater than a discharge voltage plateau for the battery. In some embodiments the power delivery system may be as discussed with respect to FIG. 1.

In FIG. 3A, the battery 105 provides a voltage greater than 3.6 V to the single phase head buck regulator 111. With the battery voltage greater than 3.6 V, the head buck regulator regulates its output voltage, an upper intermediate output voltage, to 3.6 V. The switched capacitor charge pump 121 down converts the 3.6 V upper intermediate output voltage to a lower intermediate output voltage of 1.2 V. The four phase power delivery buck regulator uses the 1.2 V lower intermediate output voltage to provide a regulated voltage to the load 141. The regulated voltage to the load may be, for example, 0.8 V.

The head buck regulator includes a high side switch and a low side switch coupled in series between the voltage provided by the battery and a lower voltage, for example ground, with the voltage provided by the battery provided to the high side switch. An inductor has a first end coupled to a node between the high side switch and the low side switch. A second end of the inductor is coupled to ground by an output capacitor, with an output of the head buck regulator being taken from a node between the inductor and the output capacitor.

With the battery voltage greater than 3.6 V, the head buck regulator regulates the voltage of the output to 3.6 V. In most embodiments a signal indicative of voltage of the output is compared, for example using a comparator (not shown) to a reference signal indicative of a 3.6 V output voltage. In some embodiments control circuitry (not explicitly shown) may determine operation of the high side switch and the low side switch based on results of the comparison. For example, the control circuitry may determine whether to operate the switches in pulse frequency mode (PFM) or pulse width modulation mode (PWM) based on results of the comparison. Also for example, the control circuitry may adjust a duty cycle of the high side switch and low side switch based on a results of the comparison. In some embodiments the reference signal is developed using a bandgap reference. In some embodiments the signal indicative of voltage of the output is voltage of the output, in some embodiments the signal indicative of voltage of the output is a stepped down version of the voltage of the output.

In some embodiments the head buck regulator utilizes a first switching frequency for operation of the switches, with the first switching frequency less than a switching frequency used for operation of the power delivery buck regulator. In some embodiments the first switching frequency is half the frequency used for operation of the power delivery buck. In some embodiments the first switching frequency is one-twentieth the frequency used for operation of the power delivery buck. In some embodiments the first switching frequency is 10 MHz. In some embodiments the head buck regulator has an efficiency of 94%. In some embodiments the switched capacitor converter has an efficiency of 98%. In some embodiments the power delivery buck regulator has an efficiency of 98%.

Figure 3B:
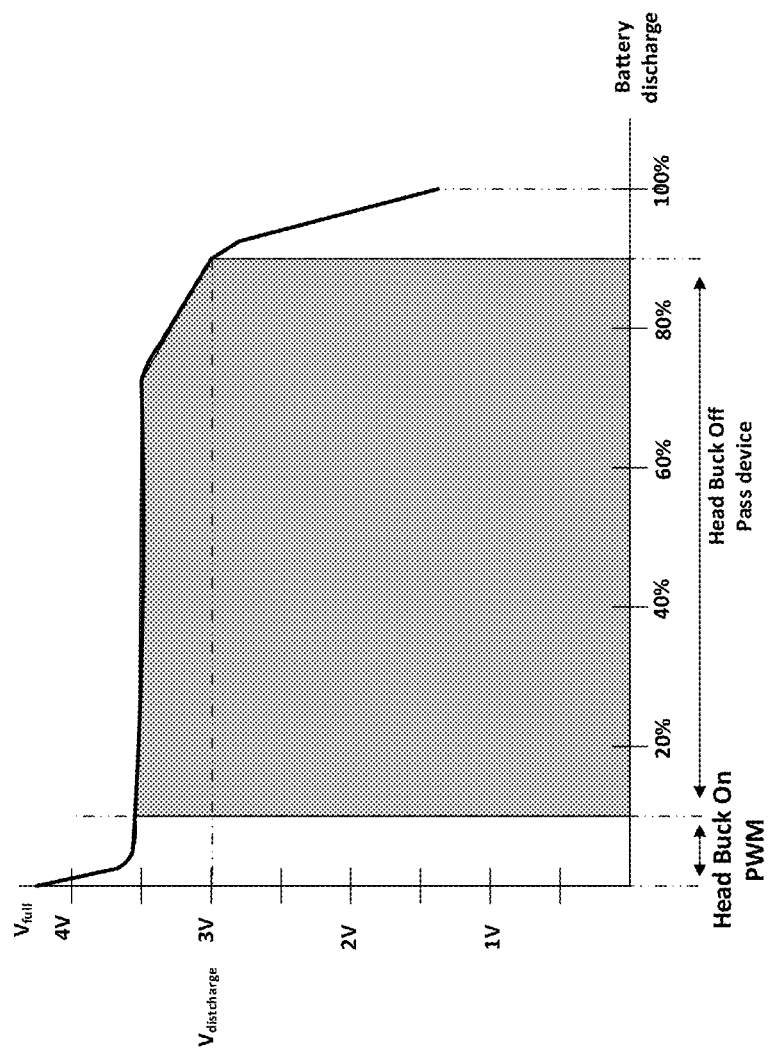
FIG. 3B is a graph showing a battery discharge profile with a first region of operation for a power delivery system in accordance with aspects of the invention.

FIG. 3B is a graph showing a battery discharge profile with a first region of operation for a power delivery system in accordance with aspects of the invention. As with FIG. 2, a vertical axis of the graph shows battery voltage, and a horizontal axis of the graph shows percentage discharge of the battery. The battery voltage with respect percentage discharge of the battery shown in FIG. 3B is the same as shown in FIG. 2.

FIG. 3B, however, indicates a first region of operation of the power delivery system, with the first region of operation being with the battery having a percentage discharge of approximately 10% or less. In some embodiments the first region of operation may alternatively be considered as being with the battery voltage just into the battery discharge voltage plateau. In some embodiments, in the first region of operation, the head buck regulator is on in PWM. In some embodiments in the first region of operation the head buck regulator operates as discussed with respect to FIG. 3A.

Figure 4A:
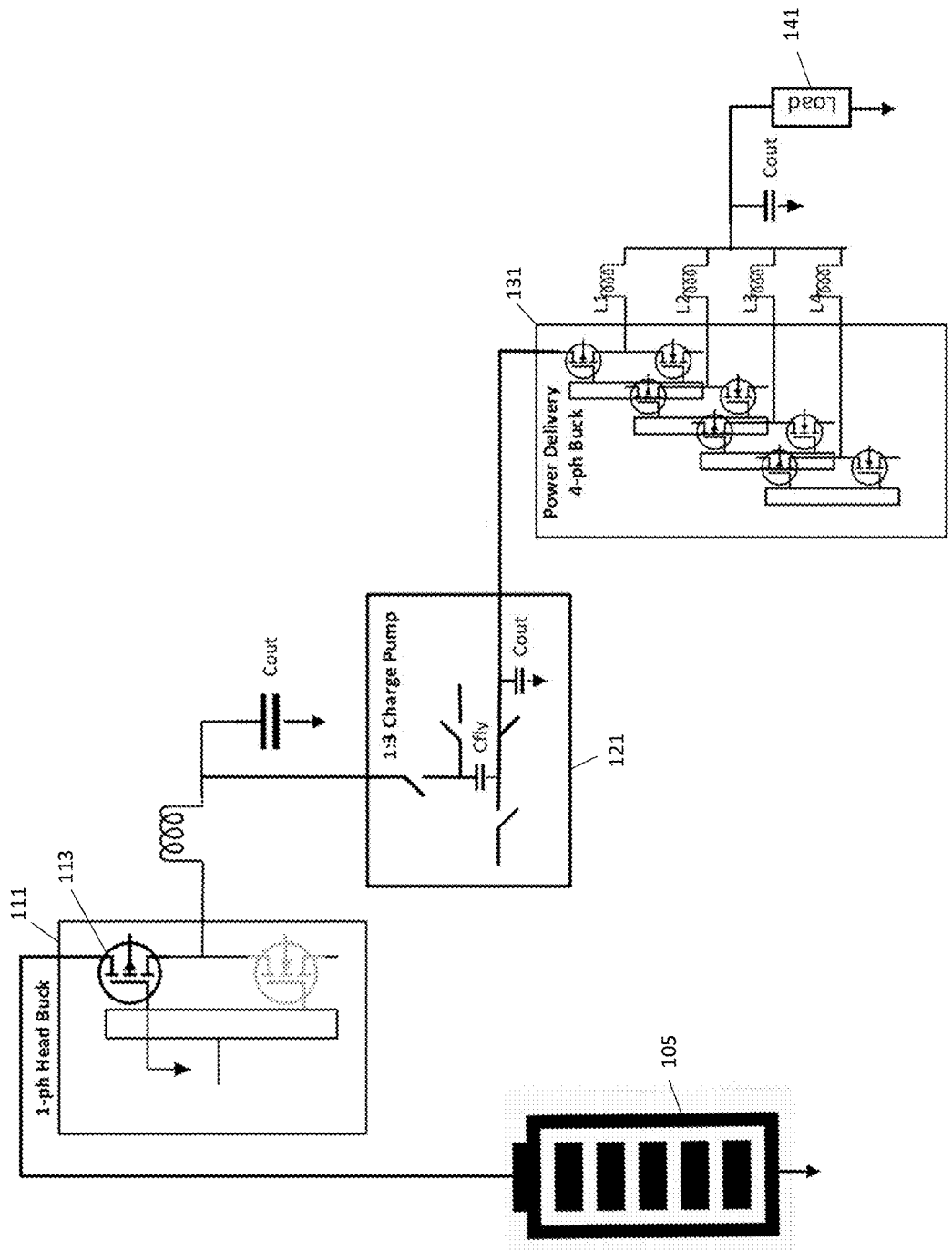
FIG. 4A is a semi-schematic, semi-block diagram illustrating operation of a power delivery system in accordance with aspects of the invention with a voltage supplied by a battery at or below a discharge voltage plateau for the battery.

FIG. 4A is a semi-schematic, semi-block diagram illustrating operation of a power delivery system in accordance with aspects of the invention with a voltage supplied by a battery at or below a discharge voltage plateau for the battery. In some embodiments the power delivery system may be as discussed with respect to FIGS. 1 and 3A.

In FIG. 4A, the battery 105 provides a voltage less than or equal to 3.6 V to the single phase head buck regulator 111. As in FIG. 3A, the head buck regulator includes a high side switch and a low side switch coupled in series between the voltage provided by the battery and a lower voltage, for example ground, with the voltage provided by the battery provided to the high side switch. An inductor has a first end coupled to a node between the high side switch and the low side switch. A second end of the inductor is coupled to ground by an output capacitor, with an output of the head buck regulator being taken from a node between the inductor and the output capacitor.

With the battery voltage less than or equal to 3.6 V, the head buck regulator keeps the high side switch closed and the low side switch open. The high side switch therefore passes the voltage from the battery to the inductor and output capacitor of the head buck regulator, which, with a very slight loss, becomes the upper intermediate voltage. In some embodiments, in such an operating configuration, the head buck regulator operates at 99% efficiency. The switched capacitor charge pump 121 down converts the upper intermediate output voltage to a lower intermediate output voltage. The four phase power delivery buck regulator uses the lower intermediate output voltage to provide a regulated voltage to the load 141.

Figure 4B:
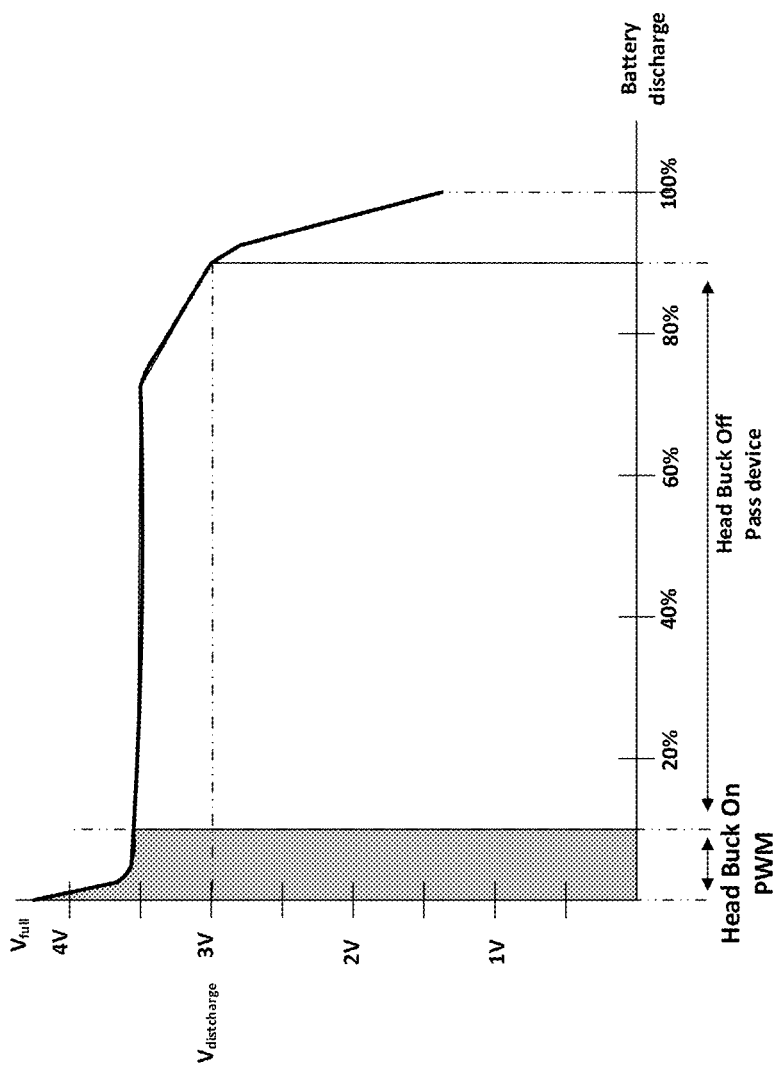
FIG. 4B is a graph showing a battery discharge profile with a second region of operation for a power delivery system in accordance with aspects of the invention.

FIG. 4B is a graph showing a battery discharge profile with a second region of operation for a power delivery system in accordance with aspects of the invention. As with FIGS. 2 and 3B, a vertical axis of the graph shows battery voltage, and a horizontal axis of the graph shows percentage discharge of the battery. The battery voltage with respect percentage discharge of the battery shown in FIG. 4B is the same as shown in FIG. 2. FIG. 4B indicates the second region of operation of the power delivery system as the region in which the battery has a percentage discharge between approximately 10% and approximately 90%. For the majority of the second region, the battery has a voltage at the battery discharge voltage plateau. For some batteries of interest, the voltage at the battery discharge voltage plateau is 3.6 V or just under 3.6 V.

Returning to FIG. 4A, the upper intermediate output voltage provided by the head buck regulator is therefore at or just under 3.6 V. As the switched capacitor charge pump performs a 3:1 down conversion, the lower intermediate output voltage provided to the power delivery buck regulator is at or just under 1.2 V, which allows the power delivery buck regulator to provide regulated power at 0.8 V to the load.

Figure 5:
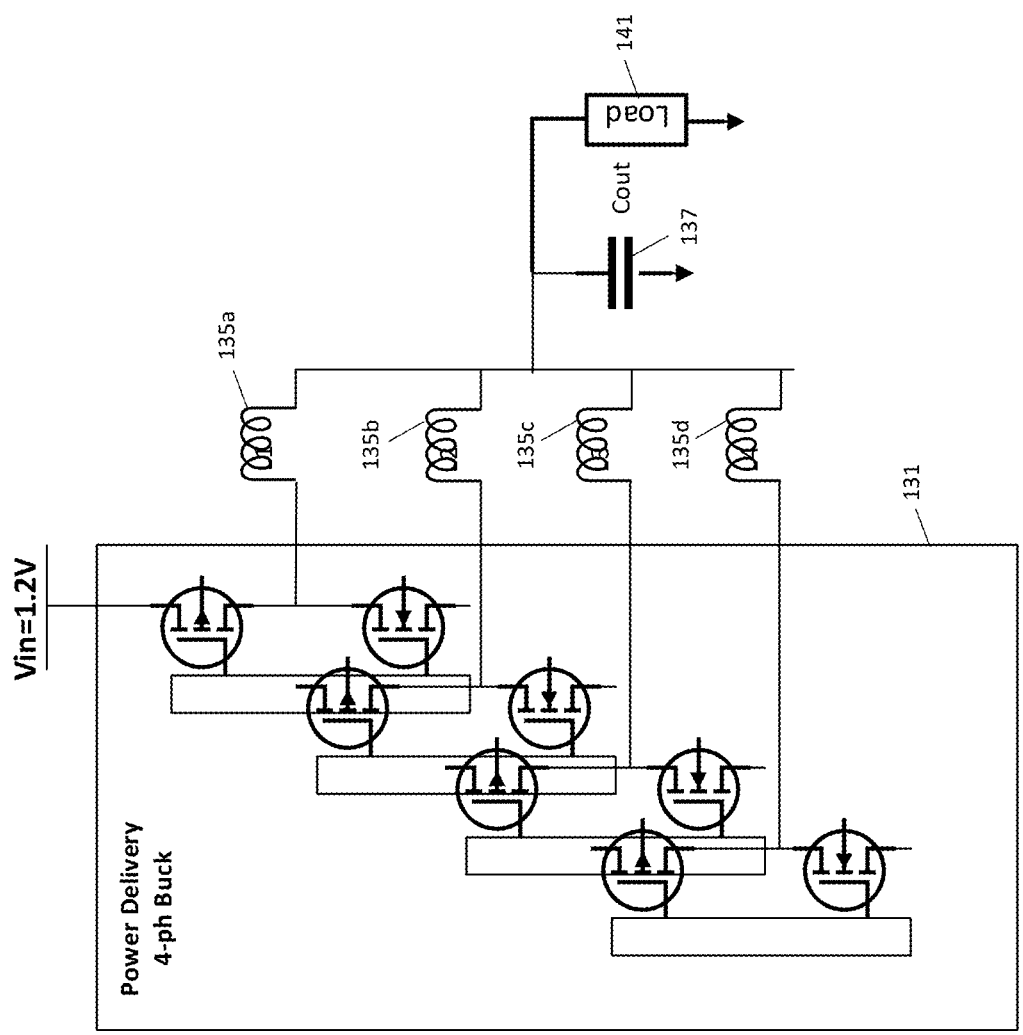
FIG. 5 is a semi-schematic, semi-block diagram of a four-phase buck converter with discrete inductors for use in a power delivery system in accordance with aspects of the invention.

FIG. 5 is a semi-schematic, semi-block diagram of a four-phase buck converter with discrete inductors, for use in a power delivery system in accordance with aspects of the invention. In some embodiments the converter of FIG. 5 is used as the power delivery buck regulator in a power delivery system, for example the power delivery system of FIGS. 1, 3A, and/or 4A.

The four-phase buck converter includes four switching phases, each including its own high side switch, low side switch, and inductor path. Each switching path has a high side switch and a low side switch connected in series between an input voltage source and a lower voltage source. For each switching phase, an output inductor 135a-d has a first end coupled to a node between the high side switch and the low side switch. A second end of each of the inductors is commonly coupled to an output capacitor 137, which is in parallel to a load 141. The load may be, for example, a processor core or other integrated circuitry.

The high side switches and low side switches are commanded to change states by a controller (not explicitly shown in FIG. 5.) The controller may be in the form of a processor, for example, but in many instances the controller is instead or in addition implemented using for example a custom integrated circuit (IC). In most embodiments the controller activates the switches for the different switch phases at different times. In various embodiments, for each individual phase, the controller operates the switches using pulse width modulation and/or pulse frequency modulation, with generally either only one or none of the high side and low side switches being closed at any given time. The duty cycle or pulse frequency will generally be based on a comparison of the output voltage provided to the load with a desired reference voltage. In many embodiments a period or frequency upon which operation of the switches may be based may depend on clock signals of a same frequency provided to the controller. In various embodiments, the clock signals will each be at the same frequency but phase-shifted to one another, for example by 90 degrees in embodiments with four phases, as in FIG. 5.

For 20 MHz operation, the inductors may each be about 10 nanoHenry (nH). In various embodiments the about 10 nH inductors are discrete inductors. In some embodiments inductance of each of the inductors is determined using the formula L=((Vin−Vout)*Vout)/VinFswImax, in which Vin is input voltage provided to the converter, Vout is desired regulated output voltage of the converter, Imax is the expected maximum output current of the converter, and Fsw is the switching frequency of the converter. In some embodiments, for the power delivery buck converter, Vin is 1.2 V, Vout is 0.8 V, Imax is 1.1 amps (A), and the switching frequency is 20 MHz.

In other embodiments the switching frequency may be much greater than 20 MHz. For switching frequencies much greater than 20 MHz, desired inductances for the converter may be much lower. In some embodiments inductors as discrete components may be avoided, with instead circuit board traces or other traces instead being used to provide desired inductances.

FIG. 6A is a semi-schematic, semi-block diagram of a four-phase buck converter with printed circuit board (PCB) provided inductance, for use in a power delivery system in accordance with aspects of the invention. In some embodiments, the inductance may be provided instead through use of metal traces and/or vias in an interposer or a package for a semiconductor multi-chip module. In some embodiments the converter of FIG. 5 is used as the power delivery buck regulator in a power delivery system, for example the power delivery system of FIGS. 1, 3A, and/or 4A.

The four-phase buck converter of FIG. 6A, like that of FIG. 5, includes four switching phases, each including its own high side switch, low side switch, and inductor path. Each switching path has a high side switch and a low side switch connected in series between an input voltage source and a lower voltage source. For each switching phase, an output inductance 611a-d has a first end coupled to a node between the high side switch and the low side switch. A second end of each of the inductances is commonly coupled to an output capacitor 137, which is in parallel to a load 141. The load may be, for example, a processor core or other integrated circuitry.

The output inductances 611a-d of the embodiment of FIG. 6A, however, are not provided by discretely packaged inductors. Instead, the inductances are provided by metal traces and vias of a printed circuit board and/or, in some embodiments, semiconductor packages and/or interposers. In some embodiments such inductances are utilized when desired inductances are relatively low. For example, in some embodiments the voltages and current specified with respect to the converter of FIG. 5 may be the same as for converter embodiments in accordance with FIG. 6A, but the switching frequency may be about 10 times greater or more, for example 200 MHz. For a converter using a 200 MHz switching frequency, the desired inductance for each switching path may be 1.2 nH.

Figure 6B:
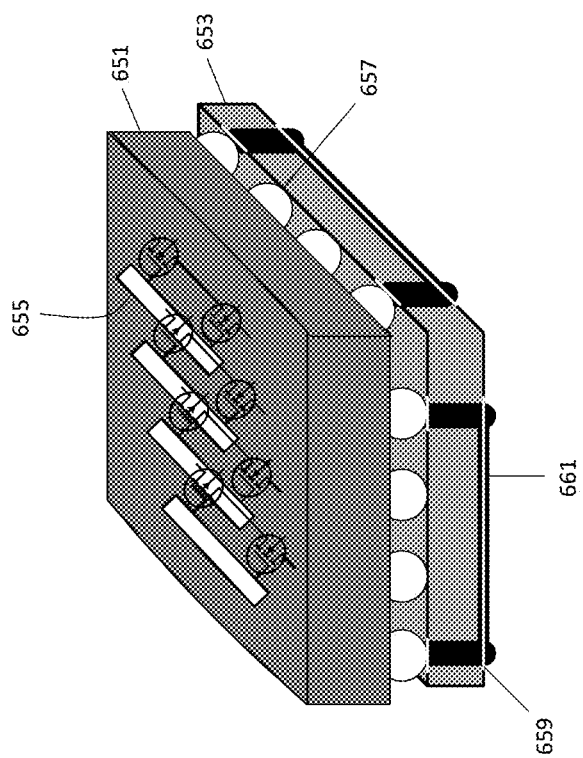
FIG. 6B is an illustration of portions of a chip and PCB, with PCB provided inductance, in accordance with aspects of the invention.

FIG. 6B is an illustration of portions of a chip and PCB, with PCB provided inductance, in accordance with aspects of the invention. In FIG. 6B, a semiconductor chip 651 is shown above a substrate 653. The substrate may be, for example, a printed circuit board. In some embodiments the substrate may be an interposer, for example for a multi-chip module, or part of a package for the semiconductor chip. The semiconductor chip includes driving and control circuitry of a voltage regulator 655, which may be for example a multi-phase buck converter, or particularly a four-phase buck converter.

Signal pathways between the semiconductor chip and the substrate are provided by solder balls, for example solder ball 657. The substrate also provides inductances through couplings of vias 659 in the substrate and metal traces 661 on or in the substrate. For the embodiment of FIG. 6B, nodes between high side switches and low side switches of the multi-phase buck converter are coupled to first ends of the inductances provided by the substrate by way of signal paths internal to the semiconductor chip and the solder balls. Similarly second ends of the inductances may be coupled to an output node of the multi-phase buck converter by way of the solder balls and signal paths internal to the semiconductor chip. In some embodiments the inductances provided by the substrate may be on the order of 1 nH.

Figure 7:
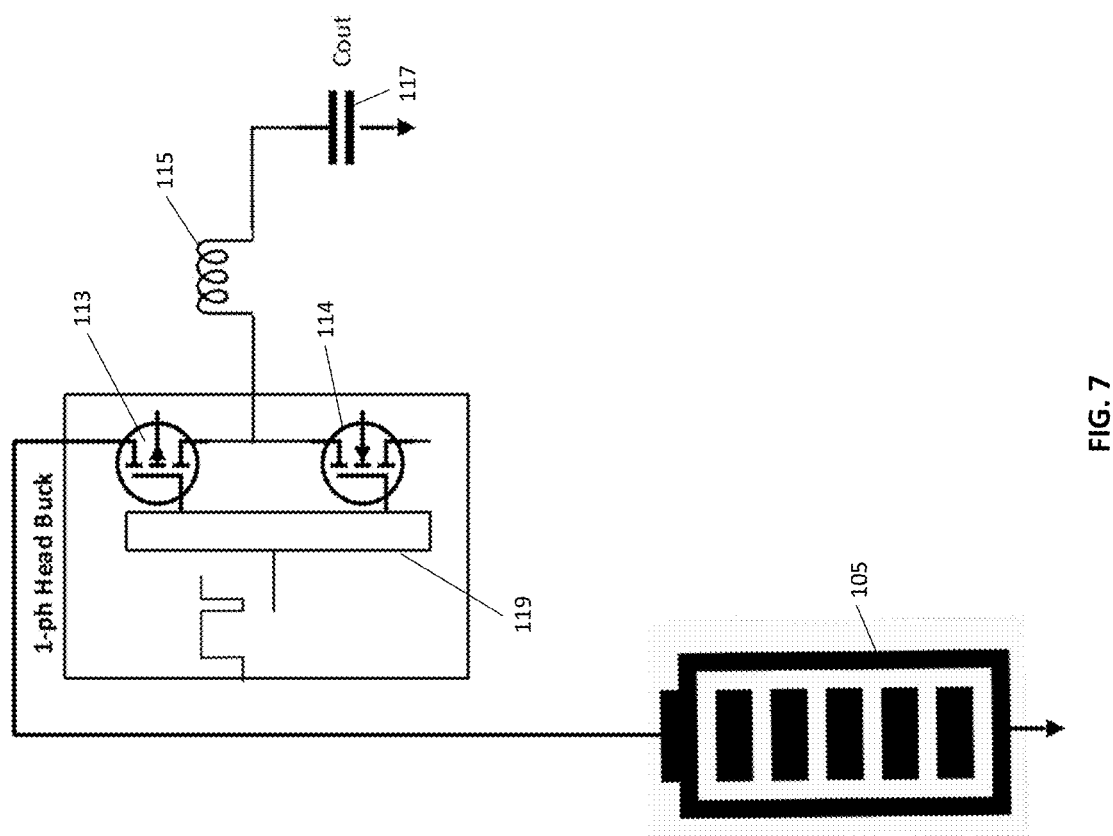
FIG. 7 is a semi-schematic, semi-block diagram including a single-phase buck converter, in accordance with aspects of the invention.

FIG. 7 is a semi-schematic, semi-block diagram including a single-phase buck converter, in accordance with aspects of the invention. In some embodiments the buck converter is the buck converter of FIG. 1 or FIG. 3A.

The buck converter includes a high side switch 113 and a low side switch 114 coupled in series between a source of power, a battery 105, and ground. In operation, the high side switch may be active with the low side switch inactive, the low side switch may be active with the high side switch inactive, or both switches may be inactive. An inductor 115 has a first end coupled to a node between the high side switch and the low side switch. A second end of the inductor is coupled to ground by way of an output capacitor 117, with a node between the second end of the inductor providing an output of the single phase buck converter. The output of the converter may be considered an intermediate voltage, or, more particularly, an upper immediate voltage, with the switched capacitor charge pump developing a lower intermediate voltage.

A controller 119 controls operation of the high side switch and the low side switch. In some embodiments the controller controls operation of the high side switch and the low side switch to regulate the output of the converter to a voltage about the expected discharge voltage plateau for the battery. In some embodiments the controller controls operation of the switches in PWM and/or PFM mode when the converter can regulate its output voltage to a predetermined voltage using power provided by the battery. Once the battery discharges to an extent that the voltage provided by the battery is insufficient for regulation of the converter output voltage to the predetermined voltage, the controller maintains the high side switch in a closed state and the low side switch in an open state. With the high side switch maintained in the closed state and the low side switch maintained in the open state, the buck converter serves as a low ohmic pass device for power from the battery.

Figure 8:
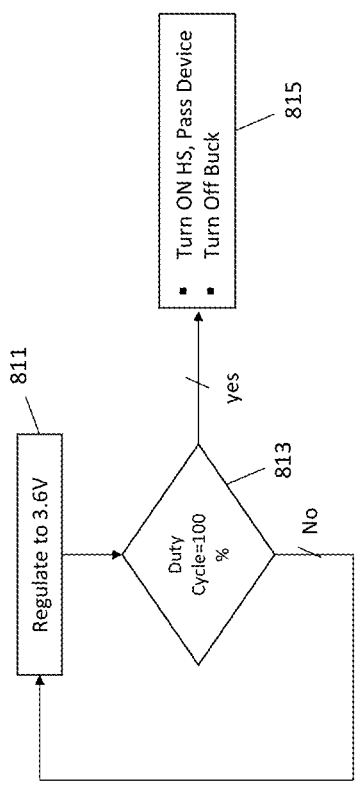
FIG. 8 is a flow diagram of a method for use in operating the buck converter of FIG. 7.

FIG. 8 is a flow diagram of an example method for use in operating the buck converter of FIG. 7. In some embodiments the method is performed by a buck converter. In some embodiments the method, or portions of the method, is performed by a controller for a buck converter. In some embodiments the method is performed by a power delivery system, for example the power delivery system of FIG. 1, or portions of a power delivery system.

In block 811 the method regulates output voltage of a buck converter to a predetermined voltage. In some embodiments the predetermined voltage is a voltage at an expected battery discharge voltage plateau. In some embodiments the predetermined voltage is 3.6 V. In some embodiments the output voltage is regulated through operation of switches of the buck converter. In some embodiments the operation of the switches is based on a comparison of the output voltage of the buck converter, or an indication of the output voltage, with the predetermined voltage, or a reference voltage indicative of the predetermined voltage.

In block 813 the method determines if a duty cycle of operation of the switches is equal to 100 percent. In some embodiments a duty cycle of operation of the switches equal to 100 percent indicates a high side of the switch is to be on all of the time as the buck converter attempts to regulate its output voltage to 3.6 V. In some embodiments a duty cycle of operation of the switches equal to 100 percent indicates that the voltage supplied to the buck converter is less than 3.6 V (or some voltage just slightly above 3.6 V, taking into account losses through the buck converter).

If the method determines that the duty cycle of operation of the switches is not equal to 100 percent, the process continues to regulate output voltage of the buck converter to 3.6 V. If, however, the method determines that the duty cycle of operation of the switches is equal to 100 percent, the process goes to block 815.

In block 815 the method closes the high side switch of the buck converter, if not already closed, opens the low side switch, if not already open, and maintains the high side switch in the closed state and the low side switch in the open state. In some embodiments the method also turns off other circuitry of the buck converter. With the high side switch closed, the low side switch open, and the other circuitry of the buck converter off, or substantially all of the other circuitry of the buck converter off, the method effectively transforms the buck converter into a low ohmic pass device.

In some embodiments external circuitry may determine that the battery has been recharged sufficiently such that the method may return to operations of block 811. In some embodiments the buck converter may maintain operation of sufficient circuitry to determine that the battery has been recharged sufficiently such that the method may return to operations of block 811.

The method thereafter returns.

Figure 9:
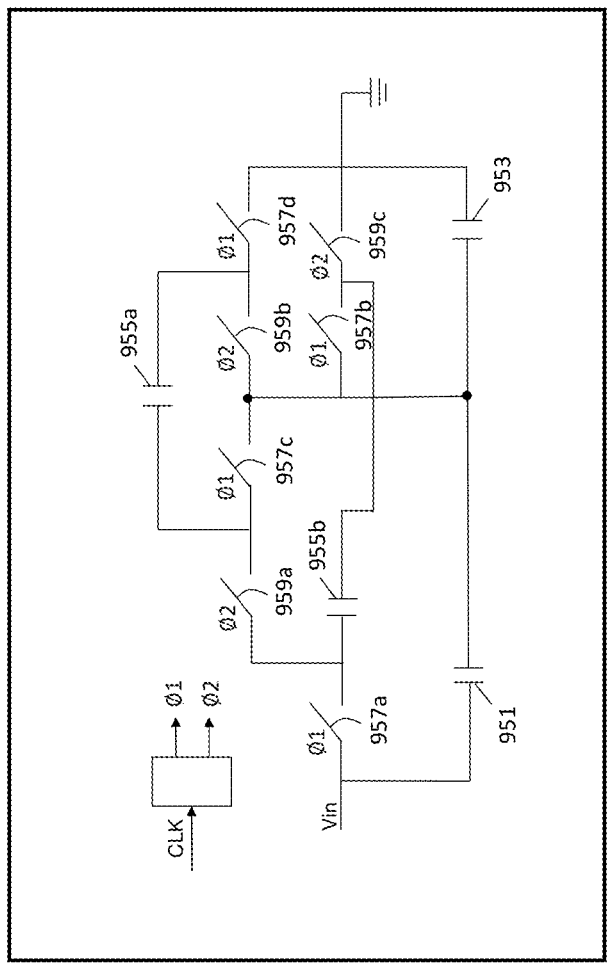
FIG. 9 is a schematic of a switched capacitor charge pump for use in a power delivery system in accordance with aspects of the invention.

FIG. 9 is a schematic of a switched capacitor charge pump for use in a power delivery system in accordance with aspects of the invention. The switched capacitor charge pump of FIG. 9 provides for down conversion of an input voltage by a factor of 3. The switched capacitor charge pump of FIG. 9 is exemplary only, in various embodiments other topologies for a switched capacitor charge pump providing a down conversion of an input voltage by a factor of 3 may be used instead.

The switched capacitor converter of FIG. 9 makes use of clock signals at a same frequency, but differing phases φ1 and φ2, generally 180 degrees out of phase. A voltage input signal is provided as an input to the switched capacitor converter, for example a signal provided as an output of an inductive stage of the head buck regulator of FIG. 1. The input is provided to capacitors 951 and 953 arranged in series between the input and ground (or some other lower voltage level, for example as discussed with respect to FIG. 1). An output of the switched capacitor charge pump is taken from a node between capacitors 951 and 953.

Flyback capacitors 955a,b are alternatively coupled in parallel with the capacitors 951, 953 or in series between the output and ground by either between the input and the output or between the output and ground by closing either a first set of switches 957a,b,c,d or a second set of switches 959a,b,c, respectively. The first set of switches are open or closed at the same time, for example when the signal φ1 is high. Similarly, the second set of switches are open or closed at the same time, for example when the signal φ2 is high.

Although the invention has been discussed with respect to various embodiments, it should be recognized that the invention comprises the novel and non-obvious claims supported by this disclosure.

What is claimed is:

1. A power delivery system, comprising:
a first voltage regulator configured to output an upper intermediate voltage about an expected discharge voltage plateau of a battery for use by the power delivery system, the first voltage regulator comprising a buck voltage regulator including a high side switch and a low side switch, the buck voltage regulator configured to regulate the upper intermediate voltage about the expected discharge voltage plateau of the battery when a voltage of the battery is greater than the expected discharge voltage plateau, the buck voltage regulator configured to operate as a pass device with the high side switch closed and the low side switch open when the voltage of the battery is not greater than the expected discharge plateau of the battery;

a switched capacitive charge pump configured to down convert the upper intermediate voltage of the first voltage regulator to a lower intermediate voltage; and a second voltage regulator configured to use the lower intermediate voltage to provide power to a load.

2. The power delivery system of claim 1, wherein the first voltage regulator is a single phase buck voltage regulator and the second voltage regulator is a multi-phase buck voltage regulator.

3. The power delivery system of claim 1, wherein the first voltage regulator is a single phase buck voltage regulator.

4. The power delivery system of claim 1, wherein the second voltage regulator is a buck voltage regulator.

5. The power delivery system of claim 4, wherein the second voltage regulator is a multi-phase buck voltage regulator.

6. The power delivery system of claim 1, wherein the expected discharge voltage plateau is 3.6 Volts.

7. The power delivery system of claim 6, wherein the switched capacitive charge pump is configured to down convert the upper intermediate voltage by a factor of 3.

8. The power delivery system of claim 1, wherein the second voltage regulator uses discrete inductors.

9. The power delivery system of claim 1, wherein the second voltage regulator uses vias and traces of a PCB to provide inductances for the second voltage regulator.

10. The power delivery system of claim 1, wherein the buck voltage regulator configured to regulate the upper intermediate voltage about the expected discharge voltage plateau of the battery when the voltage of the battery is greater than the expected discharge voltage plateau using pulse width modulation (PWM).

11. The power delivery system of claim 10, wherein the first voltage regulator is configured to operate as a pass device with the high side switch closed and the low side switch open with the PWM duty cycle for the first voltage regulator being 100%.

* * * * *